United States Patent
Dong et al.

(10) Patent No.: US 12,486,467 B2
(45) Date of Patent: Dec. 2, 2025

(54) O-ALKYLATED STERICALLY HINDERED ANTIOXIDANTS

(71) Applicant: SONGWON INDUSTRIAL CO., LTD., Ulsan (KR)

(72) Inventors: Jun Dong, Friendswood, TX (US); Jeonkyu Lee, Ulsan (KR); Gerard Mulqueen, Frauenfeld (CH); Shinhyun Kim, Ulsan (KR)

(73) Assignee: SONGWON INDUSTRIAL CO., LTD., Ulsan (KR)

( * ) Notice: Subject to any disclaimer, the term of this patent is extended or adjusted under 35 U.S.C. 154(b) by 0 days.

(21) Appl. No.: 18/569,488

(22) PCT Filed: Jun. 22, 2022

(86) PCT No.: PCT/KR2022/008901
§ 371 (c)(1),
(2) Date: Dec. 12, 2023

(87) PCT Pub. No.: WO2022/270925
PCT Pub. Date: Dec. 29, 2022

(65) Prior Publication Data
US 2024/0279565 A1    Aug. 22, 2024

Related U.S. Application Data

(60) Provisional application No. 63/214,888, filed on Jun. 25, 2021.

(51) Int. Cl.
| | | |
|---|---|---|
| C10M 129/70 | (2006.01) | |
| C07C 69/734 | (2006.01) | |
| C08K 5/134 | (2006.01) | |
| C10M 129/76 | (2006.01) | |
| C10M 169/04 | (2006.01) | |
| C10N 30/02 | (2006.01) | |
| C10N 30/10 | (2006.01) | |
| C10N 30/20 | (2006.01) | |
| C10N 40/25 | (2006.01) | |

(52) U.S. Cl.
CPC ......... C10M 129/70 (2013.01); C07C 69/734 (2013.01); C08K 5/1345 (2013.01); C10M 129/76 (2013.01); C10M 169/04 (2013.01); C10M 2207/282 (2013.01); C10M 2207/284 (2013.01); C10N 2030/02 (2013.01); C10N 2030/10 (2013.01); C10N 2030/20 (2013.01); C10N 2040/25 (2013.01)

(58) Field of Classification Search
CPC .............. C10M 129/70; C10M 129/76; C10M 169/04; C10M 2207/282; C10M 2207/284; C10M 2207/026; C10M 2207/281; C10M 141/02; C10M 2203/1025; C07C 69/734; C07C 67/30; C07C 69/612; C08K 5/1345; C10N 2030/02; C10N 2030/10; C10N 2030/20; C10N 2040/25; C10N 2070/02
See application file for complete search history.

(56) References Cited

U.S. PATENT DOCUMENTS

| | | |
|---|---|---|
| 3,655,559 A | 4/1972 | Holt |
| 3,717,611 A | 2/1973 | Dennler et al. |
| 4,770,802 A | 9/1988 | Ishida et al. |
| 5,892,097 A * | 4/1999 | Ross ........... C07C 67/03 560/75 |
| 6,204,412 B1 | 3/2001 | Lai |
| 6,315,925 B1 | 11/2001 | Aebli et al. |
| 6,355,839 B1 | 3/2002 | Onopchenko |

(Continued)

FOREIGN PATENT DOCUMENTS

| | | | |
|---|---|---|---|
| EP | 0384393 B1 | 5/1996 | |
| GB | 191026676 A | * 10/1911 | |

(Continued)

OTHER PUBLICATIONS

Rudnick et al. "Lubricant Additives, Chemistry and Application", Chemistry and Applications, 2003, 213 pages.

(Continued)

*Primary Examiner* — Cephia D Toomer
(74) *Attorney, Agent, or Firm* — Meunier Carlin & Curfman LLC

(57) ABSTRACT

The present invention relates to a composition a composition comprising compound of the general formula (I)

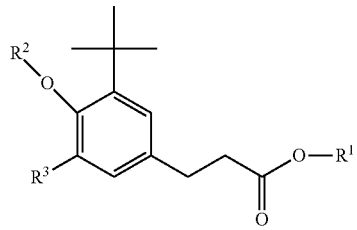

in which
$R^1$ a straight or branched C1-C24 alkyl group;
$R^2$ is a C1-C8 alkyl group;
$R^3$ is a C1-C8 alkyl group.

The invention also relates to industrial products such as additive blends, engine oils and polymer compositions comprising this compound of the general formula (I) and to the use the compound of the general formula (I) as an additive such in industrial products such as additive blends, engine oils and polymer compositions.

24 Claims, No Drawings

(56) References Cited

U.S. PATENT DOCUMENTS

| | | |
|---|---|---|
| 6,419,797 B1 | 7/2002 | Scherf et al. |
| 7,531,487 B2 | 5/2009 | Al-Akhdar et al. |
| 7,847,030 B2 | 12/2010 | Patil et al. |
| 9,782,183 B1 | 10/2017 | Rich |
| 2005/0192455 A1 | 9/2005 | Gatto et al. |
| 2010/0173811 A1 | 7/2010 | Arrowsmith et al. |
| 2020/0165188 A1 | 5/2020 | Rowland |

FOREIGN PATENT DOCUMENTS

| | | |
|---|---|---|
| GB | 1046353 A | 10/1966 |
| JP | S62-012786 B2 | 3/1987 |
| JP | S62-032184 B | 7/1987 |
| JP | S63295531 A | 12/1988 |
| JP | H02180851 A | 7/1990 |
| JP | H3-021537 B | 3/1991 |
| JP | H05238989 A | 9/1993 |
| JP | H6-048989 A | 2/1994 |
| JP | H06-107596 A | 4/1994 |
| JP | H06-135897 A | 5/1994 |
| WO | 9507963 A1 | 3/1995 |
| WO | 2005097728 A1 | 10/2005 |
| WO | 2017011159 A1 | 1/2017 |

OTHER PUBLICATIONS

Chemtura, Naugalube 438 Sell Sheet, Aug. 2013. 2 pages.
Lanxess, Naugalube 428 Octylated diphenylamine, May 2016, 3 pages.
Non-Final Rejection mailed Mar. 22, 2018, in U.S. Appl. No. 15/189,167, 9 pages.
CAS RN 2119223-89-9, STN Entry Date Aug. 24, 2017.
CAS RN 2115953-96-1, STN Entry Date Aug. 18, 2017.
CAS RN 1535424-33-9, STN Entry Date Feb. 2, 2014.
CAS RN 1508749-56-1, STN Entry Date Jan. 1, 2014.
CAS RN 1505208-57-0, STN Entry Date Dec. 27, 2013.
International Search Report and Written Opinion issued in PCT/KR2022/008901, mailed Sep. 1, 2022.

* cited by examiner

O-ALKYLATED STERICALLY HINDERED ANTIOXIDANTS

CROSS REFERENCE TO RELATED APPLICATION

This application is a U.S. National Stage application of PCT/KR2022/008901 filed Jun. 22, 2022, which claims priority to U.S. Provisional Application No. 63/214,888 filed Jun. 25, 2021.

TECHNICAL FIELD

The present invention relates to a composition comprising O-alkylated sterically hindered antioxidants. The invention also relates to a process for the preparation of O-alkylated sterically hindered antioxidants, industrial products comprising such compositions and to the use of O-alkylated sterically hindered antioxidants as an additive in industrial products.

BACKGROUND ART

As a main type of industrial products, lubricants, such as those used in a variety of machinery, are susceptible to oxidative deterioration during storage, transportation, and usage, particularly when such lubricants are exposed to high temperatures and iron catalytic environments, which greatly promote their oxidation. This oxidation, if not controlled, contributes to the formation of corrosive acidic products, sludge, varnishes, resins, and other oil-insoluble products, and may lead to a loss of designated physical and tribological properties of the lubricants. It is therefore a common practice to include an antioxidant in lubricants to prevent, at least to some extent, oxidation, so as to extend their useful life.

Lubricant compositions containing various diarylamines or phenolic compounds as antioxidants are widely known in the art. U.S. Pat. No. 5,892,097, for example, discloses the preparation of sterically hindered phenolic compounds and their use as antioxidants. These antioxidants are prepared by reacting an alcohol such as isooctanol with methyl-3,5-di-tert-butyl-4-hydroxyhydrocinnamate to form isooctyl-3,5-di-tert-butyl-4-hydroxyhydrocinnamate in a transesterification reaction. However, the antioxidative performance of the sterically hindered phenolic compounds obtained by such a reaction and known from the prior art can still be improved.

DISCLOSURE

Technical Problem

It is therefore an object of the present invention to overcome the disadvantages of the prior art associated with compositions that are used to improve the properties of industrial products such as engine oils, particularly with respect to their oxidative stability.

In particular, it is an object of the present invention to provide a composition that, when being added as a separate additive or as a component in a so called "additive package" into a lubricant such as an engine oil, improves the properties of the lubricant, particularly with respect to the oxidative stability.

A contribution to at least partly solving at least one, preferably more than one, of the above objects is made by the independent claims. The dependent claims provide preferred embodiments which contribute to at least partly solving at least one of the objects.

Technical Solution

A contribution to solving at least one of the objects according to the present invention is made a composition comprising
i) a compound of the general formula (I)

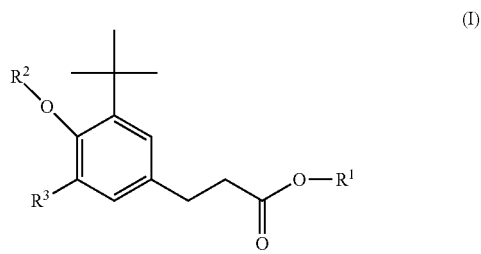

(I)

in which
$R^1$ is a straight or branched C1-C24 alkyl group, preferably a methyl group or a C7-C9 alkyl group, more preferably a methyl group or linear or branched C8-alkyl group, most preferably a branched octyl group, wherein an isooctyl group or a 2-ethylhexyl group or both is/are most preferred;
$R^2$ is a C1-C8 alkyl group, preferably a methyl group or an ethyl group, more preferably a methyl group;
$R^3$ is a C1-C8 alkyl group, preferably a C1-C4 alkyl group, more preferably a tert-butyl group.

Surprisingly, it has been discovered that O-alkylated sterically hindered compounds having the general formula (I) are particularly effective antioxidants, compared to their corresponding phenolic derivatives. Not only the pure or substantially pure O-alkylated sterically hindered compounds themself, preferably the pure O-methylated sterically hindered compounds, are effective antioxidants, but also mixtures of, for example, commercially available antioxidants based on isooctyl-3,5-di-tert-butyl-4-hydroxy-hydrocinnamate into which a certain amount of the corresponding O-alkylated derivatives (i. e. isooctyl-3,5-di-tert-butyl-4-alkoxy-hydrocinnamate, pre-ferably isooctyl-3,5-di-tert-butyl-4-methoxy-hydrocinnamate) have been added.

Compound of the general formula (I) can be prepared by means of a first embodiment of a process according to the present invention comprising the process steps:
I) providing a compound of the general formula (I)

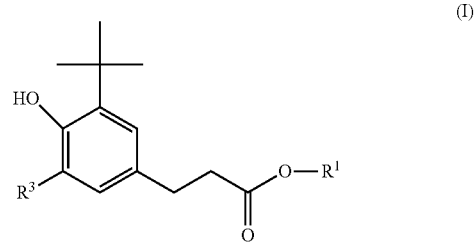

(I)

in which
$R^1$ is a straight or branched C1-C24 alkyl group, preferably a methyl group or a C7-C9 alkyl group, more preferably a methyl group or linear or branched C8-alkyl group, most preferably a branched octyl group, wherein an isooctyl group or a 2-ethylhexyl group or both is/are most preferred;

$R^3$ is a C1-C8 alkyl group, preferably a C1-C4 alkyl group, more preferably a tert-butyl group;

II) reacting the compound provided in process step I) with an alkylating agent comprising at least one alkyl-group $R^2$, wherein $R^2$ is a C1-C8 alkyl group, preferably a methyl group or an ethyl group, more preferably a methyl group.

Compound of the general formula (I) can also be prepared by means of a second embodiment of a process according to the present invention comprising the process steps:

I) providing a compound of the general formula (I)

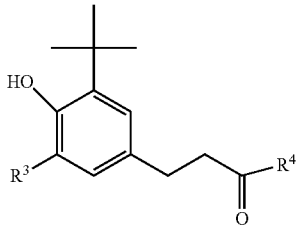

in which $R^3$ is a C1-C8 alkyl group, preferably a C1-C4 alkyl group, more preferably a tert-butyl group;

$R^4$ is a straight or branched C1-C5 alkyl group, preferably a methyl group;

II) reacting the compound provided in process step I) with an alkylating agent comprising at least one alkyl-group $R^2$, wherein $R^2$ is a C1-C8 alkyl group, preferably a methyl group or an ethyl group, more preferably a methyl group;

III) reacting the compound obtained in process step II) with an alcohol $R^1$-OH, wherein $R^1$ is a straight or branched C1-C24 alkyl group, preferably a methyl group or a C7-C9 alkyl group, more preferably a methyl group or linear or branched C8-alkyl group, most preferably a branched octyl group, wherein an isooctyl group or a 2-ethylhexyl group or both is/are most preferred, to substitute residue $R^4$ by residue $R^1$ in a transesterification reaction.

According to a particularly preferred embodiment of the composition according to the present invention $R^1$ is a C7-C9 alkyl group, more preferably a linear or branched C8-alkyl group, even more preferably a branched octyl group, wherein an isooctyl group or a 2-ethylhexyl group or both is/are most preferred;

$R^2$ is a methyl group;

$R^3$ is a tert-butyl group.

A particularly preferred antioxidant is thus an octyl-3,5-di-tert-butyl-4-methoxy-hydrocinnamate (=octyl 3-(3,5-di-tert-butyl-4-methoxyphenyl)propanoate), preferably having one of the following structures:

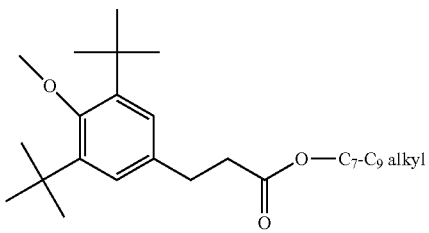

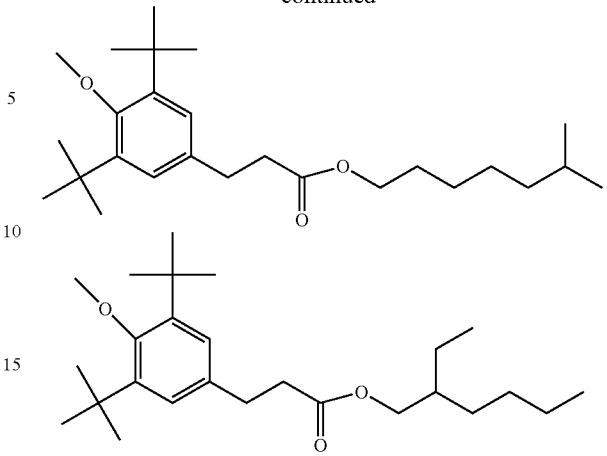

Isooctyl-3,5-di-tert-butyl-4-methoxy-hydrocinnamate can, for example, be prepared by catalytic O-methylation of isooctyl-3,5-di-tert-butyl-4-hydroxy-hydrocinnamate using methylating agents such as dimethyl carbonate, methyl iodide, methyl bromide, dimethyl sulfate, diazomethane, methanol, trimethylsulfonium salt or tetramethyl ammonium salts such as hydroxide or tetramethylammonium chloride. A process for the O-methylation of phenols or phenol derivatives using tetramethyl ammonium chloride as the methylating agent is, for example, disclosed by Panahi et al. in "*Efficient and selective microwave-assisted O-methylation of phenolic compounds using tetramethylammonium hydroxide (TMAH)*", Green Process Synth (Vol. 8, 2019), pages 584-589. For example, isooctyl-3,5-di-tert-butyl-4-methoxy-hydrocinnamate can be prepared by reacting isooctyl-3,5-di-tert-butyl-4-hydroxy-hydrocinnamate with iodomethane in the presence of basic compounds such as KOH or by first reacting methyl-3,5-di-tert-butyl-4-hydroxy-hydrocinnamate with iodomethane in the presence of basic compounds such as KOH to obtain methyl 3-(3,5-di-tert-butyl-4-methoxyphenyl)propionate and then to react methyl 3-(3,5-di-tert-butyl-4-methoxyphenyl)propionate with iso-octanol to obtain isooctyl-3,5-di-tert-butyl-4-methoxy-hydrocinnamate in a transesterification reaction.

According to a further preferred embodiment of the composition according to the present invention the composition comprises at least 0.1 wt.-%, or at least 1 wt.-%, or at least 5 wt.-%, or at least 10 wt.-%, or at least 20 wt.-%, or at least 30 wt.-%, or at least 40 wt.-%, or at least 50 wt.-%, or at least 60 wt.-%, or at least 70 wt.-%, or at least 80 wt.-%, or at least 90 wt.-%, or at least 95 wt.-%, or at least 99 wt.-% of the compound of the general formula (I), preferably isooctyl-3,5-di-tert-butyl-4-methoxy-hydrocinnamate, in each case based on the total weight of the composition. According to a particular embodiment of the composition according to the present invention the content of the compound of the general formula (I), preferably the content of isooctyl-3,5-di-tert-butyl-4-methoxy-hydrocinnamate, in the composition is in the range from 0.1 to 99 wt.-%, more preferably in the range from 1 to 95 wt.-% and even more preferably in the range from 5 to 90 wt.-%, in each case based on the total weight of the composition.

According to a further particular embodiment of the composition according to the present invention, this composition has been obtained by supplementing a composition comprising isooctyl-3,5-di-tert-butyl-4-hydroxy-hydrocinnamate with a certain amount of the corresponding O-alkylated derivative (i. e. with a certain amount of isooctyl-3,5-di-tert-butyl-4-alkoxymethoxyhydrocinnamate, preferably isooctyl-3,5-di-tert-butyl-4-methoxy-hydrocinnamate).

According to that particular embodiment of the composition according to the present invention the composition thus further comprises
- ii) an octyl-3,5-di-tert-butyl-4-hydroxy-hydrocinnamate having one of the formulas of general structure (II), preferably isooctyl-3,5-di-tert-butyl-4-hydroxy-hydrocinnamate:

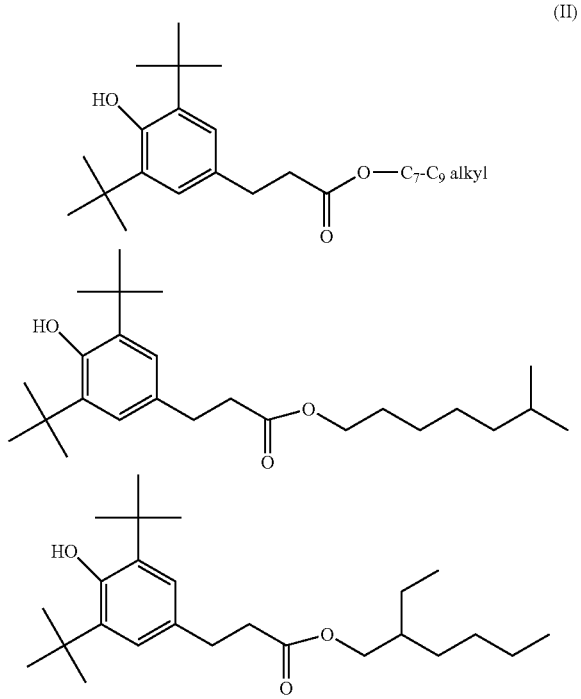

(II)

In context with this particular embodiment of the composition according to the present invention it is furthermore preferred that the composition comprises
- i) at least 0.01 wt.-%, preferably at least 0.1 wt.-% and more preferably at least 1 wt. % octyl-3,5-di-tert-butyl-4-methoxyhydrocinnamate, preferably isooctyl-3,5-di-tert-butyl-4-methoxyhydrocinnamate, wherein it is also preferred that the amount of octyl-3,5-di-tert-butyl-4-methoxyhydrocinnamate is less than 35 wt.-%, preferably less than 25 wt.-% and more preferably less than 15 wt.-%;
- ii) at least 25 wt.-%, preferably at least 45 wt.-% and more preferably at least 65 wt. % octyl-3,5-di-tert-butyl-4-hydroxyhydrocinnamate, preferably isooctyl-3,5-di-tert-butyl-4-hydroxyhydrocinnamate, wherein it is also preferred that the amount of octyl-3,5-di-tert-butyl-4-hydroxyhydrocinnamate is less than 99.99 wt.-%, preferably less than 99.9 wt.-% and more preferably less than 99 wt.-%;

in each case based on the total weight of components i) and ii) in the composition.

In context with this particular embodiment of the composition according to the present invention it is furthermore preferred that the composition comprises
- iii) less than 5 wt.-%, preferably less than 2.5 wt.-% and more preferably less than 1 wt.-% of compounds selected from the group consisting of a dioctyl-α-(3,5-di-tert-butyl-4-hydroxybenzyl)glutarate, preferably a dioctyl-α-(3,5-di-tert-butyl-4-hydroxybenzyl)glutarate having formula (III), in which $R_x$ and $R_y$ are independently from each other selected from the group consisting of an isooctyl group and a 2-ethylhexyl group, most preferably diisooctyl-α-(3,5-di-tert-butyl-4-hydroxybenzyl)glutarate,

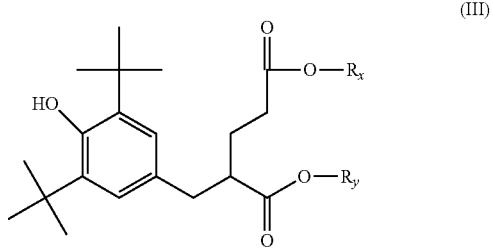

(III)

di-tert-butylphenol,
methyl-3,5-di-tert-butyl-4-hydroxy-hydrocinnamate,
dimethyl-α-(3,5-di-tert-butyl-4-hydroxy-benzyl)glutarate and
an alcohol, preferably octanol, more preferably isooctanol, in each case based on the total weight of components i), ii), and iii) in the composition In context with this particular embodiment of the composition according to the present invention it is furthermore preferred that the composition comprises octyl-3,5-di-tert-butyl-4-methoxy-hydrocinnamate and dioctyl-α-(3,5-di-tert-butyl-4-hydroxybenzyl)glutarate, preferably isooctyl-3,5-di-tert-butyl-4-methoxy-hydrocinnamate and diisooctyl-α-(3,5-di-tert-butyl-4-hydroxy-benzyl)glutarate, in a weight ration of at least 2:1, preferably at least 3:1, more preferably at least 4:1, even more preferably at least 6:1, even more preferably at least 8:1, even more preferably at least 10:1, even more preferably at least 15:1 and most preferably at least 20:1.

In context with this particular embodiment of the composition according to the present invention it is furthermore preferred that the composition comprises 1 to 50 wt.-%, preferably 1.5 to 45 wt.-%, more preferably 2 to 40 wt.-%, more preferably 2.5 to 35 wt.-%, more preferably 3 to 30 wt.-%, more preferably 3.5 to 25 wt.-% and even more preferably 4 to 20 wt.-% of the compound of the general formula (I), preferably isooctyl-3,5-di-tert-butyl-4-methoxy-hydrocinnamate, in each case based on the total weight of the composition.

In context with this particular embodiment of the composition according to the present invention it is furthermore preferred that at least one of the following conditions (α1) to (α5), preferably all the following conditions (α1) to (α5) is/are fulfilled is fulfilled:
- (α1) the composition has a kinematic viscosity (determined at a temperature of 40° C. according to ASTM D 445) in the range from 60 to 300 cSt, more preferably in the range from 80 to 250 cSt and more preferably in the range from 100 to 200 cSt;
- (α2) the composition has a Gardner colour (determined according to ASTM D 1544) of less than 10 Gardner, preferably less than 5 Gardner and more preferably of less than 3 Gardner;
- (α3) the composition has water content (determined according to ASTM E 203) of less than 0.5 wt.-%, preferably less than 0.3 wt.-% and more preferably less than 0.1 wt.-%;

(α4) the composition has a specific gravity (determined at a temperature of 25° C. according to ASTM D 1298) in the range from 0.900 to 1.020, preferably in the range from 0.925 to 1.010 and more preferably in the range from 0.940 to 1.000;

(σ5) the composition has a total acid number (as determined by the ASTM D664) of less than 5.0 mg KOH/g, preferably less than 2.5 mg KOH/g and more preferably less than 1.0 mg KOH/g.

In a first variant of the composition according to the present invention the total amount of component i) (if the composition does not comprise component ii)) or the total amount of components i) and ii) (if the composition comprises component ii)) in the composition is at least is at least 95 wt.-%, preferably at least 97 wt.-% and more preferably at least 99 wt.-%, in each case based on the total weight of the composition. The composition is thus present in the form of an individual additive which can be used in order to improve the oxidative stability of industrial products such as lubricants, lubricating compositions or polymer compositions.

In a second variant of the composition according to the present invention the composition is a lubricant or a lubricating composition. In context with this second variant of the composition according to the present invention it is particularly preferred that the composition is an additive blend. An "additive blend" (also called "additive package") is a blend for treatment of industrial and automotive lubricants, which comprises a combination of different additives such as antioxidants, antiwear additives, dispersants, ashless (metal free) polymeric materials, detergents, antifoam additives, viscosity index improvers, copper passivators, rust inhibitors, pour point depressants, demulsifiers and friction modifiers. The composition comprising the compound of the general formula (I) according to the present invention, preferably the composition comprising isooctyl-3,5-di-tert-butyl-4-methoxy-hydrocinnamate, may thus be present in the form of such an additive package.

In context with this second variant of the composition according to the present invention it is furthermore particularly preferred that the total amount of component i) (if the composition does not comprise component ii)) or the total amount of components i) and ii) (if the composition comprises component ii)) in the composition is in the range from 0.01 to 95 wt.-%, preferably in the range from 0.1 to 60 wt.-% and more preferably in the range from 0.5 to 30 wt.-%, in each case based on the total weight of the additive blend.

According to third variant of the composition according to the present invention the composition is an engine oil comprising at least one base oil. In context with this third variant of the composition according to the present invention it is particularly preferred that the total amount of component i) (if the composition does not comprise component ii)) or the total amount of components i) and ii) (if the composition comprises component ii)) in the composition is in the range from 0.01 to 10 wt.-%, preferably in the range from 0.05 to 5 wt.-% and more preferably in the range from 0.1 to 2 wt.-%, in each case based on the total weight of the engine oil.

According to fourth variant of the composition according to the present invention the composition is a polymer composition comprising a polymer, preferably a thermoplastic polymer, a duroplastic polymer, an elastomer, a polyol, a rubber, such as a butadiene rubber (BR), a styrene butadiene rubber (SBR), an ethylene propylene rubber (EPR), a nitrile butadiene rubber (NBR) or a mixture thereof, or a mixture comprising at least two of these polymers. In context with this fourth variant of the composition according to the present invention it is particularly preferred that the total amount of component i) (if the composition does not comprise component ii)) or the total amount of components i) and ii) (if the composition comprises component ii)) in the composition is in the range from 0.01 to 10 wt.-%, preferably in the range from 0.05 to 2.0 wt.-% and more preferably in the range from 0.1 to 1.0 wt.-%, in each case based on the total weight of the polymer composition.

In context with this fourth variant of the composition according to the present invention it is furthermore particularly preferred that the thermoplastic polymer is selected from the group consisting of low density polyethylene (LDPE), linear low density polyethylene (LLDPE), medium density polyethylene (MDPE), high density polyethylene (HDPE), homopolymers derived from mono- and diethylenically unsaturated hydrocarbon monomers of C3 and above, such as, polypropylene, polyisobutylene, polymethylbutene-1, polymethylpentene-1, polybutene-1, polyisobutylene, and the like; copolymers derived from two or more monomers, such as, ethylene-propylene copolymers, preferably having at least a majority of propylene, propylene-butene-1 copolymers, propylene-isobutylene copolymers, and the like, and blends thereof, polystyrenes; polyvinylhalides; and engineering thermoplastics, for example, polyamides, polyesters, polyphenyleneoxides, polyphenylenesulfides, polyacetals, aliphatic polyketone co- or terpolymers, poly(ethersulfones), polycarbonates, liquid crystalline polymers, poly(etheretherketones), polyurethanes and poly(arylates). It is preferred that the thermoplastic resin that is protected by the composition according to the present invention be a polyurethane or a polypropylene.

If the polymer to be stabilized by the composition according to the present invention is a polyurethane, for example for the production of a flexible or rigid foam, the composition according to the present invention can be added to the polyol that is subsequently reacting with isocyanate to form the polyurethane.

A contribution to solving at least one of the objects according to the invention is also made by the use of a compound of the general formula (I)

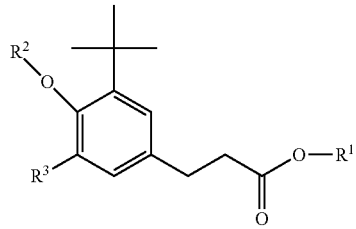

in which $R^1$ is a straight or branched C1-C24 alkyl group, preferably a methyl group or a C7-C9 alkyl group, more preferably a methyl group or linear or branched C8-alkyl group, most preferably a branch octyl group, wherein an isooctyl group or a 2-ethylhexyl group or both is/are most preferred;

$R^2$ is a C1-C8 alkyl group, preferably a methyl group or an ethyl group, more preferably a methyl group;

$R^3$ is a C1-C8 alkyl group, preferably a C1-C4 alkyl group, more preferably a tert-butyl group;

as an additive in a lubricant of lubricating composition, preferably in an engine oil, or in a polymer composition or both, the compound of the general formular (I) preferably being isooctyl-3,5-di-tert-butyl-4-methoxy-hydrocinnamate.

BEST MODE

Additives in the Additive Blend According to the Present Invention

The additive blend (or additive package) according to the present invention is a blend for treatment of industrial and automotive lubricants, which comprises—in addition to the base oil—a combination of different additives such as antioxidants, antiwear additives, dispersants, ashless (metal free) polymeric materials, detergents, antifoam additives, viscosity index improvers, copper passivators, rust inhibitors, pour point depressants, demulsifiers and friction modifiers. The composition comprising a compound of the general formula (I), preferably the composition comprising isooctyl-3,5-di-tert-butyl-4-methoxy-hydrocinnamate, may thus by a part of such an additive package Suitable antioxidants in the additive blend which can be present in addition to the composition comprising a compound of the general formula (I), preferably in addition to the composition comprising isooctyl-3,5-di-tert-butyl-4-methoxy-hydrocinnamate, are selected from:

1) Alkylated monophenols, for example 2,6-di-tert-butyl-4-methylphenol, 2-butyl-4,6-di-methylphenol, 2,6-di-tert-butyl-4-ethylphenol, 2,6-di-tert-butyl-4-n-butylphenol, 2,6-di-tert-butyl-4-iso-butylphenol, 2,6-di-cyclopentyl-4-methylphenol, 2-(α-methyl-cyclohexyl)-4,6-dimethylphenol, 2,6-di-octadecyl-4-methylphenol, 2,4,6-tricyclohexylphenol, 2,6-di-tert-butyl-4-methoxymethylphenol, linear or side chain-branched nonylphenols, for example 2,6-dinonyl-4-methylphenol, 2,4-dimethyl-6-(1'-methyl-undec-1'-yl) phenol, 2,4-dimethyl-6-(1'-methylheptadec-1'-yl) phenol, 2,4-dimethyl-6-(1'-methyltridec-1'-yl)-phenol or mixtures thereof;
2) Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol or 2,6-di-dode-cylthiomethyl-4-nonylphenol;
3) Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate or bis(3,5-di-tert-butyl-4-hydroxyphenyl)adipate;
4) Tocopherols, for example α-, β-, γ- or δ-tocopherol or mixtures thereof (vitamin E);
5) Hydroxylated thiodiphenyl ethers, for example 2,2'-thiobis(6-tert-butyl-4-methylphe-nol), 2,2'-thiobis(4-octylphenol), 4,4'-thiobis(6-tert-butyl-3-methylphe-nol), 4,4'-thiobis-(6-tert-butyl-2-methylphenol), 4,4'-thiobis(3,6-di-sec.-amylphenol) or 4,4'-bis(2,6-di-methyl-4-hydroxyphenyl)disulfide;
6) Alkylidenebisphenols, for example 2,2'-methylenebis (6-tert-butyl-4-methylphenol), 2,2'-methylenebis(6-tert-butyl-4-ethylphenol), 2,2'-methylenebis(4-methyl-6-(x-methyl-cyclohexyl)-phenol), 2,2'-methylenebis(4-methyl-6-cyclohexylphenol), 2,2'-methylene-bis-(6-nonyl-4-methylphenol), 2,2'-methylenebis(4,6-di-tert-butylphenol), 2,2'-ethylidene-bis(4,6-di-tert-butylphenol), 2,2'-ethylidenebis(6-tert-butyl-4-isobutylphenol), 2,2'-methylenebis(6-(x-methylbenzyl)-4-nonylphenol), 2,2'-methylene-bis(6-α,α-dimethylben-zyl)-4-nonylphenol), 4,4'-methylen-ebis(2,6-di-tert-butylphenol), 4,4'-methylene-bis(6-tert-butyl-2-methylphenol), 1,1-bis(5-tert-butyl-4-hydroxy-2-methylphenyl)-butane, 2,6-bis(3-tert-butyl-5-methyl-2-hydroxybenzyl)-4-methylphenol, 1,1,3-tris (5-tert-butyl-4-hydroxy-2-methylphenyl)butane, 1,1-bis(5-tert-butyl-4-hydroxy-2-methylphenyl)-3-n-dodecylmercaptobutane, ethylene glycol bis(3,3-bis(3'-tert-butyl-4'-hydroxyphenyl)butyrate), bis(3-tert-butyl-4-hydroxy-5-methylphenyl)dicyclopentadiene, bis(2-(3'-tert-butyl-2'-hydroxy-5'-methylbenzyl)-6-tert-butyl-4-methylphenyl)terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane or 1,1,5,5-tetra(5-tert-butyl-4-hydroxy-2-methylphenyl)-pentane;
7) O-, N- and S-benzyl compounds, for example 3,5,3',5'-tetra-tert-butyl-4,4'-dihydroxy-dibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl)amine, bis(4-tert-butyl-3-hydroxy-2,6-dimethylbenzyl)dithioterephthalate, bis(3,5-di-tert-butyl-4-hydroxy-benzyl)sulfide or isooctyl 3,5-di-tert-butyl-4-hydroxy-benzylmercaptoacetate;
8) Hydroxybenzylated malonates, for example dioctadecyl 2,2-bis(3,5-di-tert-butyl-2-hy-droxybenzyl)malonate, dioctadecyl 2-(3-tert-butyl-4-hydroxy-5-methylbenzyl)-malo-nate, d-dodecyl mercaptoethyl-2,2-bis(3,5-di-tert-butyl-4-hydroxybenzyl)-malonate or di(4-(1,1,3,3-tetramethylbutyl)phenyl)-2,2-bis(3,5-di-tert-butyl-4-hydroxybenzyl)malonate;
9) Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxyben-zyl)-2,3,5,6-tetramethylbenzene or 2,4,6-tris(3,5-di-tert-butyl-4-hydroxybenzyl)phenol;
10) Triazine compounds, for example 2,4-bisoctylmer-capto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis (3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine or 1,3,5-tris-(3,5-dicyclohexyl-4-hydroxybenzyl)-isocyanurate;
11) Benzylphosphonates, for example dimethyl 2,5-di-tert-butyl-4-hydroxybenzyl-phosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzyl-phosphonate or the calcium salt of the monoethyl ester of 3,5-di-tert-butyl-4-hydroxybenzylphosphonic acid;
12) Acylaminophenols, for example 4-hydroxylaura-nilide, 4-hydroxystearanilide or octyl N-(3,5-di-tert-butyl-4-hydroxyphenyl) carbamate;
13) Esters of $-(3,5-di-tert-butyl-4-hydroxyphenyl)propionic acid, β-(5-tert-butyl)-4-hydroxy-3-methylphenyl) propionic acid, β-(3,5-dicyclohexyl-4-hydroxyphenyl)-propionic acid, 3,5-di-tert-butyl-4-hydroxyphenylacetic acid or β-(5-tert-butyl)-4-hydroxypheny))-3-thiabutyric acid with mono- or polyhydric alcohols, e. g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethyl-hexanediol, trimethylolpropane, 4-hydroxymethyl-1-phospha-2,6,7-trioxabicyclo(2.2.2)octane, glycerol or transesterification products based on natural triglycerides of, for example, coconut oil, rape seed oil, sunflower oil or colza oil;

14) Amides of β-(3,5-di-tert-butyl-4-hydroxyphenyl)propionic acid, e. g. N,N'-bis(3,5-di-tert-butyl-4-hydroxyphenylpropionyl) hexamethylenediamine, N,N'-bis(3,5-di-tert-butyl-4-hydroxyphenylpropionyl) trimethylenediamine or N,N'-bis(3,5-di-tert-butyl-4-hydroxyphenylpropionyl)hydrazine;

15) Ascorbic acid (vitamin C);

16) Amine-type antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methyl-pentyl)-p-phenylenediamine, N,N'-bis(1-methyl-heptyl)-p-pheny-lenediamine, N,N'-dicyclohexyl-p-phenylenediamine, N,N'-diphenyl-p-phenylenediamine, N,N'-di-(naphth-2-yl)-p-phenylenediamine, N-isopropyl-N'-phenyl-p-phenylene-diamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido) diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, e. g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)-amine, 2,6-di-tert-butyl-4-dimethylamino-me-thylphenol, 2,4'-diamino-diphenylmethane, 4,4'-diamino-diphenylmethane, N,N,N',N'-tetramethyl-4,4'-diamino-diphenylmethane, 1,2-di-((2-methyl-phenyl)-amino) ethane, 1,2-di-(phenylamino)propane, (o-tolyl) biguanide, di(4-(1',3'-dimethyl-butyl)-phenyl)-amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, mixtures of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'''-tetraphenyl-1,4-diaminobut-2-ene, N,N-bis(2,2,6,6-tetramethylpiperidin-4-yl)hexamethylenediamine, bis-(2,2,6,6-tetramethylpiperidin-4-yl) sebacate, 2,2,6,6-tetramethylpiperidin-4-one or 2,2,6,6-tetramethylpiperidin-4-ol; and 17) Aliphatic or aromatic phosphites, esters of thiodipropionic acid or of thiodiacetic acid, or salts of dithiocarbamic or dithiophosphoric acid, 2,2,12,12-tetramethyl-5,9-dihydroxy-3,7,1-trithiatridecane or 2,2,15,15-tetramethyl-5,12-dihydroxy-3,7,10,14-tetrathiahexadecane.

Suitable antiwear additives are selected from:
1) Dihydrocarbyl dithiophosphate metal salts where the metal is aluminum, lead, tin manganese, cobalt, nickel, zinc or copper, but most often zinc. The zinc salt (zinc dialkyl dithiophosphate) is represented as

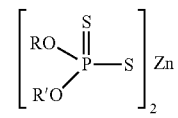

where R and R' are independently represent $C_1$-$C_{20}$ alkyl, $C_3$-$C_{20}$ alkenyl, $C_5$-$C_{12}$ cycloalkyl, $C_7$-$C_{13}$ aralkyl or $C_6$-$C_{10}$ aryl, for example R and R' are independently $C_1$-$C_{12}$ alkyl; and 2) Sulfur- and/or phosphorus- and/or halogen-containing compounds, such as sulfurized olefins and vegetable oils, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, di(2-ethylhexyl)aminomethyltolyltriazole, derivatives of 2,5-dimercapto-1,3,4-thiadiazole, ethyl((bisisopropyloxyphosphinothioyl)thio) propionate, triphenyl thiophosphate(triphenyl phosphorothioate), tris(alkylphenyl)phosphorothioates and mixtures thereof (for example tris(isononyl-phenyl)phosphorothioate), diphenylmonononylphenylphosphorothioate, isobutylphenyldiphenylphosphorothioate, the dodecylamine salt of 3-hydroxy-1,3-thiaphosphetan-3-oxide, trithiophosphoric acid 5,5,5-tris(isooctyl 2-acetate), derivatives of 2-mercaptobenzothiazole, such as 1-(N,N-bis(2-ethylhexyl) aminomethyl)-2-mercapto-1H-1,3-benzothiazole or ethoxycarbonyl 5-octyldithiocarbamate.

Suitable dispersants are selected from:
1) Mannich bases that are condensation reaction products of a high molecular weight phenol, an allylene polyamine and an aldehyde such as formaldehyde;
2) Succinic-based dispersants that are reaction products of a olefin polymer and succinic acylating agent (acid, anhydride, ester or halide) further reacted with an organic hydroxy compound and/or an amine; and
3) High molecular weight amides and esters such as reaction products of a hydrocarbyl acylating agent and a polyhydric aliphatic alcohol (such as glycerol, pentaerythritol or sorbitol).

Ashless (metal-free) polymeric materials that usually contain an oil soluble high molecular weight backbone linked to a polar functional group that associates with particles to be dispersed are typically used as dispersants. Commonly used hydrocarbon backbone materials are olefin polymers and copolymers, i. e.-ethylene, propylene, butylene, isobutylene, styrene; there may or may not be further functional groups incorporated into the backbone of the polymer. Polar materials such as amines, alcohols, amides or esters are attached to the backbone via a bridge.

Suitable detergents are selected from: calcium, magnesium, barium, sodium or lithium salts of organic acids, for example sulphonates, alkylphenates, sulfurized alkyl phenates, carboxylates, salicylates, phosphonates, thiophosphonates and phosphinates. The salts may be neutral or may be over-based by, for example, metal hydroxides or carbonates.

Suitable antifoam additives are selected from: silicone oils, polysiloxanes and polyethylene glycol ethers.

Suitable viscosity index improvers are selected from: polyisobutylene, co-polymers of ethylene and propylene, polyacrylates, polymethacrylates, vinylpyrrolidone/methacrylate copolymers, polyvinylpyrrolidones, polybutenes, olefin copolymers, styrene/acrylate copolymers, styrene/isoprene copolymers, styrene/isobutadiene copolymers, isoprene/butadiene copolymers and polyethers.

Suitable copper passivators are selected from:
1) Benzotriazoles and their derivatives, for example 4- or 5-alkylbenzotriazoles (e. g. tolutriazole) and derivatives thereof, 4,5,6,7-tetrahydrobenzotriazole, 5,5'-methylenebisbenzotriazole; Mannich bases of benzotriazole or tolutriazole, such as 1-(di(2-ethylhexyl) aminomethyl)tolutriazole and 1-(di-(2-ethylhexyl) aminomethyl)-benzotriazole; alkoxyalkylbenzotriazoles, such as 1-(nonyloxymethyl)-benzotriazole, 1-(1-butoxyethyl)-benzotriazole or 1-(1-cyclohexyloxybutyl)-tolutriazole;
2) Imidazole derivatives, for example 4,4'-methylenebis (2-undecyl-5-methyl-imidazole), bis((N-methyl)imidazol-2-yl)carbinol octyl ether;
3) Sulfur-containing heterocyclic compounds, for example 2-mercaptobenzothiazole, 2,5-dimercapto-1,3,4-thiadiazole, 2,5-dimercaptobenzothiadiazole and derivatives thereof or 3,5-bis(di(2-ethylhexyl) aminomethyl)-1,3,4-thiadiazolin-2-one; and
4) Amino compounds, for example salicylidenepropylenediamine, salicylaminoguanidine or salts thereof.

Suitable rust inhibitors are selected from:
1) Nonionic polyoxyalkylene polyols and their esters, polyoxyalkylene phenols, organic acids, their esters, metal salts, amine salts and anhydrides, for example alkyl- and alkenylsuccinic acids and the partial esters thereof with alcohols, diols or hydroxycarboxylic acids, partial amides of alkyl- and alkenyisuccinic acids, 4-nonylphenoxyacetic acid, alkoxy- and alkoxyethoxycarboxylic acids, such as dodecyloxyacetic acid, dodecyloxy(ethoxy) acetic acid and the amine salts thereof, or N-oleoylsarcosine, sorbitan monooleate, lead naphthenate and alkenylsuccinic anhydrides, for example dodecenylsuccinic anhydride, 2-(2-carboxyethyl)-1-dodecyl-3-methylglycerol and its salts, for example, sodium and triethanolamine salts;
2) Nitrogen-containing compounds selected from: i) Primary, secondary or tertiary aliphatic or cycloaliphatic amines and amine salts of organic and inorganic acids, for example oil-soluble alkylammonium carboxylates, and also 1-(N,N-bis(2-hydroxyethyl) amino)-3-(4-nonylphenoxy)propan-2-ol, or ii) Heterocyclic compounds, for example: substituted imidazolines or oxazolines, for example, 2-heptadecenyl-1-(2-hydroxyethyl)-imidazoline;
3) Phosphorus-containing compounds, for example amine salts of phosphoric acid, phosphoric acid partial esters or phosphonic acid partial esters or zinc dialkyldithiophosphates;
4) Sulfur-containing compounds, for example barium dinonylnaphthalene-sulfonates, calcium petroleum-sulfonates, alkylthio-substituted aliphatic carboxylic acids, esters of aliphatic 2-sulfocarboxylic acids or salts thereof; and
5) Glycerol derivatives, for example glycerol monooleate, 1-(alkylphenoxy)-3-(2-hydroxyethyl)glycerols, 1-(alkylphenoxy)-3-(2,3-dihydroxypropyl)glycerols or 2-carboxyalkyl-1,3-dialkylglycerols.

Suitable pour point depressants are selected from polymethacrylates and alkylated naphthalene derivatives.

Suitable demulsifiers are selected from polyetherpolyols and dinonylnaphthalenesulfonates.

Suitable friction modifiers are selected from fatty acids and their derivatives, e. g. natural esters of fatty acids such as glycerol monooleate, amides, imides and amines, e. g. oleylamine, sulfur containing organomolybdenum dithiocarbamates, sulfur-phosphorus containing organomolybdenum dithiophosphates, sulfur-nitrogen containing organomolybdenum compounds based on dispersants, molybdenum carboxylate salts, molybdenum-amine complexes, molybdenum amine/alcohol/amid complexes and molybdenum cluster compounds, Teflon® and molybdenum disulfide.

Base Oils in the Lubricants According to the Present Invention

The lubricants, preferably the engine oil according to the present invention comprises at least one base oil (i. e. a lubricant of lubricating viscosity) and the composition comprising a compound of the general formula (I) according to the present invention, preferably the composition comprising isooctyl-3,5-di-tert-butyl-4-methoxy-hydrocinnamate.

Suitable base oils are mineral and synthetic base oils chosen from Group I to V. These base oils are broadly specified in the American Petroleum Institute (API) Base Oil Interchangeability Guidelines.

The base oils can be oils and greases, for example based on mineral oil or vegetable and animal oils, fats, tallow and wax or mixtures thereof. Vegetable and animal oils, fats, tallow and wax are, for example, palm kernel oil, palm oil, olive oil, colza oil, rapeseed oil, linseed oil, soy bean oil, cotton wool oil, sunflower oil, coconut oil, maize oil, castor oil, walnut oil and mixtures thereof, fish oils, and chemically modified, e. g. epoxidized or sulphoxidezed, forms or forms prepared by genetic engineering, for example soy bean oil prepared by genetic engineering.

Examples of synthetic base oils include lubricants based on aliphatic or aromatic carboxylic esters, polymeric esters, polyalkylene oxides, phosphoric acid esters, poly-α-olefins, silicones, alkylated benzene, alkylated naphthalenes or the diester of a di basic acid with a monohydric alcohol, e.g. dioctyl sebacate or dinonyl adipate, of a triester of trimethylolpropane with a monobasic acid or with a mixture of such acids, e.g. trimetllylolpropane tripelargonate, trimethylolpropane tricaprylate or mixtures thereof, of a tetra ester of pentaerythritol with a monobasic acid or with a mixture of such acids, e.g. pentaerythrityl tetracaprylate, or of a complex ester of monobasic and dibasic acids with polyhydric alcohols, e.g. a complex ester of trimethylolpropane with caprylic and sebacic acid or of a mixture thereof. Particularly suitable in addition to mineral oils are, for example, poly-α-olefins, ester-based lubricants, phosphates, glycols, polyglycols and polyalkylene glycols and mixtures thereof with water.

When in addition to the composition comprising a compound of the general formula (I) according to the present invention, preferably in addition to the composition comprising isooctyl-3,5-di-tert-butyl-4-methoxy-hydrocinnamate, other additives are employed, it may be desirable, although not necessary, to prepare additive concentrates in the form of the above described additive blend (or additive package) comprising concentrated solutions or dispersions of the composition comprising a compound of the general formula (I) according to the present invention, preferably concentrated solutions or dispersions comprising isooctyl- 3,5-di-tert-butyl-4-methoxy-hydrocinnamate, together with one or more of said other additives, whereby several additives can be added simultaneously to the base oil to form a lubricating oil composition. Dissolution of the additive concentrate into the lubricating oil can be facilitated by solvents and by mixing accompanied by mild heating, but this action is not essential. The concentrate or additive blend will typically be formulated to contain the additives in proper amounts to provide the desired concentration in the final formulation when the additive blend is combined with a predetermined amount of the base oil. Thus, the composition comprising a compound of the general formula (I) according to the present invention can be added to small amounts of base oil or other compatible solvents along with other desirable additives to form an additive blend containing active ingredients in collective amounts of, typically, from about 2.5 to about 90 wt.-%, preferably from about 15 to about 75 wt.-%, and more preferably from about 25 percent to about 60 wt.-% additives in the appropriate proportions with the remainder being base oil. The final formulations can typically employ about 1 to 20 wt.-% of the additive blend the remainder being base oil.

Polymers in the Polymer Composition According to the Present Invention

The polymer composition according to the present invention comprises, in addition to the composition comprising a compound of the general formula (I) according to the present invention, preferably in addition to the composition comprising isooctyl-3,5-di-tert-butyl-4-methoxy-hydrocinnamate, a polymer, preferably a thermoplastic polymer, a duroplastic polymer, an elastomer, a polyol, a rubber, such as a butadiene rubber (BR), a styrene butadiene rubber (SBR), an ethylene propylene rubber (EPR), a nitrile butadiene rubber (NBR) or a mixture thereof, or a mixture comprising at least two of these polymers.

The thermoplastic polymers that can be stabilized against oxidative degradation employing the composition comprising a compound of the general formula (I) according to the present invention include resins derived from ethylene including low density polyethylene (LDPE), linear low density polyethylene (LLDPE), medium density polyethylene (MDPE), high density polyethylene (HDPE), or other ethylene derived resins that have densities from 0.85 to 1.4 gm/cm$^3$; homopolymers derived from mono- and diethylenically unsaturated hydrocarbon monomers of C3 and above, such as, polypropylene, polyisobutylene, polymethylbutene-1, polymethylpentene-1, polybutene-1, polyisobutylene, and the like; copolymers derived from two or more monomers, such as, ethylene-propylene copolymers, preferably having at least a majority of propylene, propylene-butene-1 copolymers, propylene-isobutylene copolymers, and the like, and blends thereof, polystyrenes; polyvinylhalides; and engineering thermoplastics, for example, polyamides, polyesters, polyphenyleneoxides, polyphenylenesulfides, polyacetals, aliphatic polyketone co- or terpolymers, poly(ethersulfones), polycarbonates, liquid crystalline polymers, poly(etheretherketones), polyurethanes and poly(arylates). It is preferred that the thermoplastic resin that is protected by the composition according to the present invention be a polyurethane or a polypropylene.

The invention is now described in more detail by reference to test methods and non-limiting examples.

MODE FOR INVENTION

Test Methods
Determination of Oxidative Stability

The oxidative stability was evaluated by means of a pressurized differential scanning calorimetry (PDSC) apparatus.

The PDSC examines an oil's oxidative stability under thin-film oxidation conditions. In the isothermal mode where PDSC temperature is maintained at a predetermined value, a test oil's oxidation stability is ranked according to the oxidation induction time (OIT), corresponding to an exothermic release of heat caused by the onset of oxidation of the oil. Oil giving longer OIT is generally considered more resistant to oxidation. Each blend was tested in duplicate using the following instrumental conditions and the average OIT was determined. The PDSC test temperature was 180° C.

The following measuring conditions have been selected:
Temperature ramp: 40° C./min
Pressures: 500 psi
$O_2$ flow: 100 ml/min
Sample size: ~1.5 mg
Pan: Aluminum, open

EXAMPLE

Synthesis Example 1

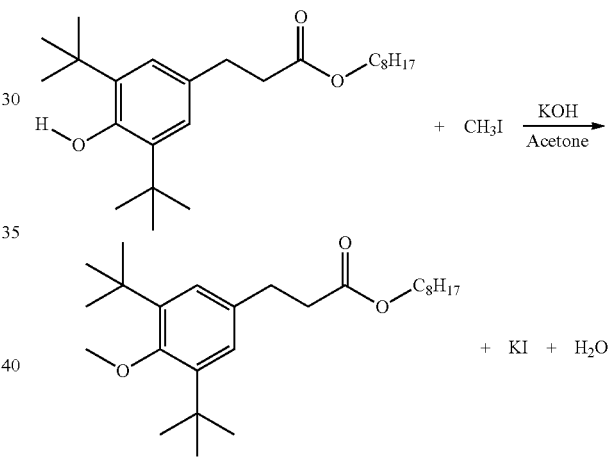

3,5-bis(1,1-dimethylethyl)-4-hydroxy-benzenepropanoic acid-C7-9-branched alkyl ester, KOH and iodomethane were stirred in acetone at rt for 18 hr. The reaction mixture was concentrated in vacuo and the residue partitioned between ethyl acetate and $H_2O$. The aqueous phase was extracted three times with ethyl acetate and the organics combined, dried ($MgSO_4$) and concentrated in vacuo. The product is obtained by distilling crude product.

Synthesis Example 2

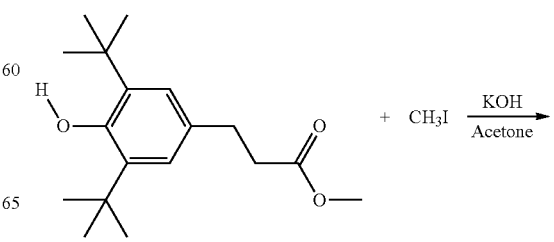

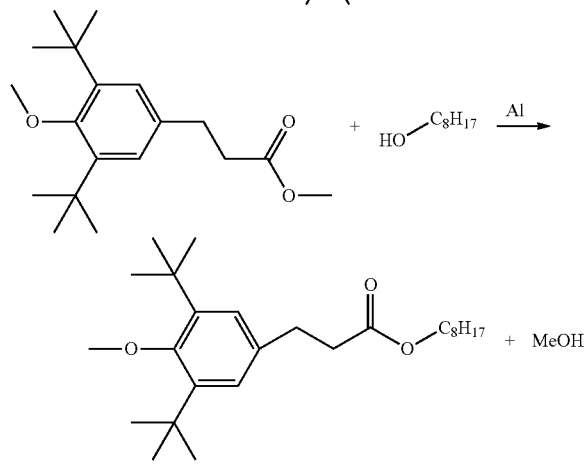

Methyl 3-(3,5-di-tert-butyl-4-hydroxyphenyl)propionate, KOH and iodomethane were stirred in acetone at rt for 18 hr. The reaction mixture was concentrated in vacuo and the residue partitioned between ethyl acetate and H₂O. The aqueous phase was extracted three times with ethyl acetate and the organics combined, dried (MgSO₄) and concentrated in vacuo to obtain a composition comprising methyl 3-(3,5-di-tert-butyl-4-methoxyphenyl)propionate. Methyl 3-(3,5-di-tert-butyl-4-methoxyphenyl)propionate, iso-octanol and aluminum were stirred at 190° C. for 18 hr. The reaction mixture was concentrated in vacuo. The product is obtained by distilling crude product.

Example 1

Isooctyl-3,5-di-tert-butyl-4-methoxy-hydrocinnamate as prepared in Synthesis Example 1 above has been used in form of a mixture with SONGNOX® L135 (which is an antioxidant that is based on isooctyl-3,5-di-tert-butyl-4-hydroxy-hydrocinnamate) (compositions A, B, C and D).

TABLE 1

| composition | amount of isooctyl-3,5-di-tert-butyl-4-methoxy-hydrocinnamate [wt.-%] |
|---|---|
| A (according to the present invention) | 1.2 wt.-% |
| B (according to the present invention) | 5.8 wt. % |
| C (according to the present invention) | 13.2 wt.-% |
| D (according to the present invention) | 24.3 wt.-% |

Using the above-described compositions, test oil was prepared to study the antioxidative property of the compositions described above. For that purpose, 0.5 wt.-% of the compositions were added to a 50:50-mixture of Yubase 4 and Yubase 6 (group III-oil mix) obtained from SK Lubricants Co. Ltd., Seoul, Korea. From the thus obtained lubricants the oxidative stability has been determined (by means of the PDSC (conducted at 180° C. according to ASTM D6186). The following results have been obtained:

TABLE 2

| Oil blend for PDSC | 1 | 2 | 3 | 4 |
|---|---|---|---|---|
| Composition A, wt. % | 0.5 | | | |
| Composition B, wt. % | | 0.5 | | |
| Composition C, wt. % | | | 0.5 | |
| Composition D, wt. % | | | | 0.5 |
| Group III base oil mix, wt. % | 99.5 | 99.5 | 99.5 | 99.5 |
| oxidative induction time (OIT) [1] determined by PDSC [min] | 19.7 | 20.3 | 26.1 | 25.4 |

As can be seen from the results shown in table 1, O-alkylated sterically hindered compounds such as isooctyl-3,5-di-tert-butyl-4-methoxy-hydrocinnamate are particularly effective antioxidants, compared to their corresponding phenolic derivatives.

The invention claimed is:

1. A composition comprising
   i) a compound of the general formula (I)

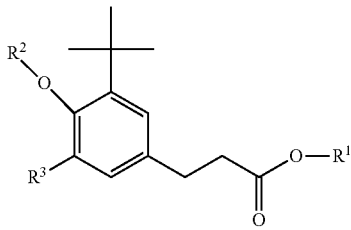

in which
R¹ is a C7-C9 alkyl group;
R² is a methyl group; and
R³ is a tert-butyl group.

2. The composition according to claim 1, wherein R1 is an isooctyl group or a 2-ethylhexyl group.

3. The composition according to claim 1, wherein the composition comprises at least 0.1 wt.-% of the compound of the general formula (I), based on the total weight of the composition.

4. The composition according to claim 3, wherein the composition comprises at least 50 wt.-% of the compound of the general formula (I), based on the total weight of the composition.

5. The composition according to claim 4, wherein the composition comprises at least 90 wt.-% of the compound of the general formula (I), based on the total weight of the composition.

6. The composition according to claim 2, further comprising
   ii) isooctyl-3,5-di-tert-butyl-4-hydroxy-hydrocinnamate.

7. The composition according to claim 6, wherein the composition comprises
   i) at least 0.01 wt.-% isooctyl-3,5-di-tert-butyl-4-methoxy-hydrocinnamate;

ii) at least 25 wt.-% isooctyl-3,5-di-tert-butyl-4-hydroxy-hydrocinnamate;
in each case based on the total weight of components i) and ii) in the composition.

8. The composition according to claim 7, wherein the composition comprises
iii) less than 5 wt.-% of compounds selected from the group consisting of diisooctyl- α-(3,5-di-tert-butyl-4-hydroxybenzyl) glutarate, di-tert-butylphenol, methyl-3,5-di- tert-butyl-4-hydroxyhydrocinnamate and isooctanol, based on the total weight of components i), ii) and iii) in the composition.

9. The composition according to claim 8, wherein the composition comprises isooctyl-3,5-di-tert-butyl-4-methoxy-hydrocinnamate and diisooctyl-α- (3,5-di-tert-butyl-4-hydroxybenzyl) glutarate in a weight ratio of at least 2:1.

10. The composition according to claim 6, wherein the composition comprises 1 to 50 wt.-% of the compound of the general formula (I), based on the total weight of the composition.

11. The composition according to claim 10, wherein the composition comprises 2.5 to 35 wt.-% of the compound of the general formula (I), based on the total weight of the composition.

12. The composition according to claim 6, wherein at least one of the following conditions (α1) to (α5) is fulfilled:
(α1) the composition has a kinematic viscosity (determined at a temperature of 40° C. according to ASTM D 445) in the range from 60 to 300 cSt;
(α2) the composition has a Gardner colour (determined according to ASTM D 1544) of less than 10 Gardner;
(α3) the composition has water content (determined according to ASTM E 203) of less than 0.5 wt.-%;
(α4) the composition has a specific gravity (determined at a temperature of 25° C. according to ASTM D 1298) in the range from 0.900 to 1.020;
(α5) the composition has a total acid number (as determined by the ASTM D664) of less than 5.0 mg KOH/g.

13. The composition according to claim 1, wherein the total amount of component i) in the composition is at least 95 wt.-%, based on the total weight of the composition.

14. The composition according to claim 1, wherein the composition is an additive blend, wherein the total amount of component i) in the composition is in the range from 0.01 to 50 wt.-%, based on the total weight of the additive blend.

15. The composition according to claim 1, wherein the composition is an engine oil further comprising at least one base oil.

16. The composition according to claim 15, wherein the total amount of component i) in the composition is in the range from 0.01 to 5 wt.-%, based on the total weight of the engine oil.

17. The composition according to claim 1, wherein the composition is a polymer composition further comprising a polymer.

18. The composition according to claim 17, wherein the total amount of component i) in the composition is in the range from 0.01 to 5 wt.-%, based on the total weight of the polymer composition.

19. The composition according to claim 1, wherein the composition is an additive present in additive blends, engine oils or polymer compositions.

20. A compound of the general formula (I)

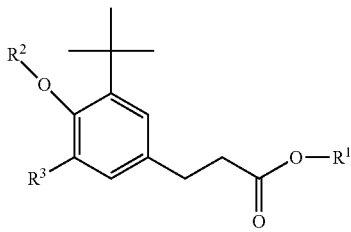

in which
$R^1$ is a straight or branched C7-C9 alkyl group;
$R^2$ is a methyl group;
$R^3$ is a tert-butyl group,
wherein the compound is an additive present in additive blends, engine oils or polymer compositions.

21. The composition according to claim 6, wherein the total amount of components i) and ii) in the composition is at least 95 wt.-%, based on the total weight of the composition.

22. The composition according to claim 6, wherein the composition is an additive blend and wherein the total amount of components i) and ii) in the composition is in the range from 0.01 to 50 wt.-%, based on the total weight of the additive blend.

23. The composition according to claim 6, wherein the composition is an engine oil comprising at least one base oil and wherein the total amount of components i) and ii) in the composition is in the range from 0.01 to 5 wt.-%, based on the total weight of the engine oil.

24. The composition according to claim 6, wherein the composition is a polymer composition comprising a polymer and wherein the total amount of components i) and ii) in the composition is in the range from 0.01 to 5 wt.-%, based on the total weight of the polymer composition.

* * * * *